Patented Mar. 24, 1925.

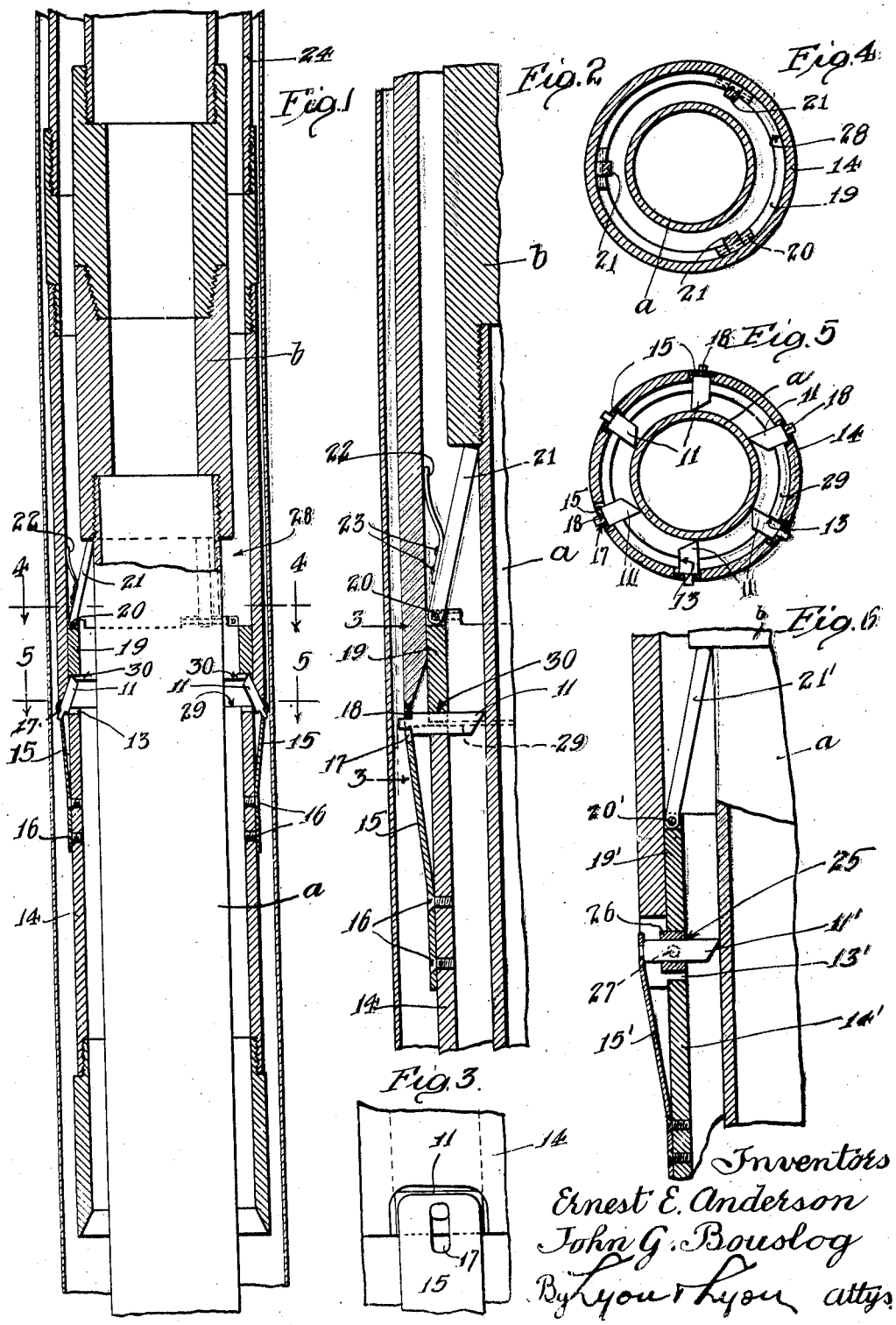

1,530,636

UNITED STATES PATENT OFFICE.

ERNEST E. ANDERSON AND JOHN G. BOUSLOG, OF BREA, CALIFORNIA.

TOOL FOR CUTTING AND REMOVING PIPE FROM WELLS.

Application filed April 9, 1923. Serial No. 630,967.

*To all whom it may concern:*

Be it known that we, ERNEST E. ANDERSON and JOHN G. BOUSLOG, citizens of the United States, residing at Brea, in the county of Orange and State of California, have invented a new and useful Tool for Cutting and Removing Pipe from Wells, of which the following is a specification.

This invention relates to tools of the type employed in cutting pipe and removing the cut-off portion, that is to say the uppermost portion.

An object of this invention is to provide a tool of this character which will sever a portion of the drill stem from another portion and which will operate to raise the severed portion from the well. This is desirable in cleaning out a well being drilled when the drilling tools become inoperative for any reason whatsoever.

Another object of this invention is to provide a tool of this character that is dependable in operation.

Another object is to make provision for automatic feeding of the cutter blades to the work.

Another object is to provide for retraction of the cutter blades from their cutting positions.

A further object is to provide a construction in which a single spring performs the double function of holding a cutter blade retracted and feeding said blade to the work.

The accompanying drawings illustrate the invention:

Figure 1 is a longitudinal mid-section of a tool embodying the invention, fragments being shown of a well casing surrounding the tool and of pipe extending through the tool, and the cutter blades being in retracted position.

Fig. 2 is an enlarged fragmental sectional view, corresponding to the left side of Figure 1, showing the cutter blade in cutting position.

Fig. 3 is a fragmental elevation from the line indicated by 3—3, Figure 2.

Figs. 4 and 5 are plan sections on the lines indicated by 4—4, and 5—5, respectively, Figure 1.

Fig. 6 is a fragmental sectional elevation, similar to Figure 2, showing a modification of the invention.

First referring to the form of the invention shown in Figures 1 to 5 inclusive, the cutting means comprise cutter blades 11 and said cutter blades are slidably and rotatably mounted in slots 13 in a tubular member or body 14 which is adapted to slip over the pipe that is to be cut. Any suitable number of cutter blades may be provided, there being six in this instance. Springs 15 engage the outer ends of the cutter blades 11 to yieldingly hold the blade retracted, as in Figure 1. The springs 15 are riveted or otherwise secured at 16 to the member 14. If desired, the free ends of the springs 15 may be slotted, as indicated at 17, to receive the outer ends of the cutter blades 11, said blades being provided with shoulders 18 adapted to seat against the springs 15 when the cutter blades are in cutting position, as in Figure 2, to feed the blades to the work.

To effect such movement of the cutter blades from their retracted positions, there are provided cutter blade retracting means comprising a blade-engaging member 19 which, in this instance, is annular. When the member 19 is held stationary and the member 14 is raised, said member 19 engages the cutter blades 11 near their inner ends and rotates said cutters inwardly and downwardly to the horizontal cutting position shown in Figure 2.

Provision is made to hold the member 19 stationary at the moment that it is desired to move the cutter blades into cutting position, and for this purpose there are pivoted to the upper edge of the member 19, as indicated at 20, any desired number of dogs 21 which project upwardly from the member 19. In this instance three dogs are provided. The dogs 21 are yieldingly held inwardly with their upper ends in contact with the pipe that is to be cut, indicated at $a$, by springs 22 which are riveted or otherwise secured at their lower ends to the dogs at 23 and which have their upper ends in contact with the inner face of the tubular member 14.

It will be readily understood that, as the member 14 is lowered around the drill pipe by suitable tubing, indicated at 24, the dogs 21 slide over the drill pipe couplings, indicated at $b$, compressing the springs 22 sufficiently to permit of this.

After the tool has been lowered to approximately the position at which the drill pipe is to be cut, the tool will be raised sufficiently to cause the dogs 21 to engage the lower end of the drill pipe coupling, said lower end thus constituting an abutment. After the dogs 21 are brought to a stop by the abutment, the tool will be raised further, thus causing the cutter blades 11 to be moved against the annular member 19 which then operates to rotate the cutters into the cutting position, as in Figure 2. The swinging of the cutter blades 11 into cutting position expands the springs 15 which, consequently, press the cutter blades inwardly into engagement with the periphery of the drill pipe. The member 19 maintains the cutter blades against collapse and the tool will then be rotated, by turning the tubing 24, so as to cause the cutter blades 11 to cut into the drill pipe. As the tool rotates, the springs 15 function to yieldingly feed the cutter blades 11 to the work. After the cutting has been effected, the severed upper portion of the pipe will rest on the cutter blades 11 and will be removed from the well by raising the tool to the surface of the earth.

If, for any reason, the tool becomes inoperative so that the cutting operation cannot be effected, the dogs 21 can be readily broken off by forcibly holding them in engagement with the drill pipe coupling and rotating the tool. After the dogs have been broken off, they will no longer hinder raising of the tool and the tool will be lowered sufficiently to collapse the cutter blades so that upon raising of the tool the blades will clear the pipe coupling *b*.

From the foregoing it will be clear that the dogs 21, member 19 and springs 15 constitute one form of means operative by raising of the tool body to cause the cutting means to cut the pipe and thereafter operative to raise the cut-off portion of the pipe. The construction described has the advantage of being quite simple and permitting raising of the tool if, for any reason, it should become inoperative and thus incapable of severing the pipe.

Another advantage is that these means provide for automatic feed of the cutting means after the dogs 21 have operated to hold the member 19 and thus cause the springs 15 to move the cutter blades into cutting position.

The slots 13 occur at the point where a change in inside diameter of the body 14 occurs and the member 19 slidably fits the larger bore portion 28 and is alined with the internal shoulder 29 that defines the junction of the larger and smaller bores. Preferably the member 19 is provided with slots 30 in its lower end in register with the slots 13 for the cutter blades 11 to slide in and be further guided and supported against side thrust when the blades are at work.

Now referring more particularly to that form of the invention disclosed in Figure 6, the elements that correspond to those previously described will be designated by the same reference characters with the addition of a prime mark. It will be seen that all of the elements are the same excepting the cutter blades 11' and their mountings. Instead of the cutter blades being mounted directly in the tubular body 14', as in the previously described form, said cutter blades are slidably mounted in slots 25 in blocks 26 which are pivoted at 27 within the slots 13'. The operations of moving the cutter blades into cutting position are the same as described above for the other form of the invention, but instead of the cutter blades pivoting about a point that is not fixed, as with the cutter blades 11, the cutter blades 11' rotate about the pivots 27 and slide within the blocks 26. One advantage of this construction over the other construction is that when the walls of the slot 25 become worn so that the cutter blades work too loosely therein, the blocks 26 may be readily renewed, whereas when the cutter blades are mounted directly in the member 14 it is necessary to replace said member 14 when the slots become worn.

We claim:

1. A tool of the character described comprising a tubular body, a cutter blade movably mounted in the tubular body, means to yieldingly hold the cutter blade in retracted position, and means operatable by raising of the tubular body to move the cutter blade from retracted position to cutting position, the first named means thereafter operating to feed the cutter blade inwardly.

2. A tool of the character described comprising a tubular body, a cutter blade movably mounted in the tubular body, means including a member engageable with an abutment on the drill pipe that is to be cut to move the cutter blade from retracted position to cutting position, and means operating to yieldingly hold the cutter blade retracted and to feed the cutter blade inwardly when said blade is in the cutting position.

3. A tool of the character described comprising a tubular body, a cutter blade rotatably and slidably mounted in the tubular body, means to rotate the cutter blade from retracted position to cutting position, and means to yieldingly hold the cutter blade retracted and to feed the cutter blade inwardly when it is in the cutting position.

4. A tool of the character described comprising a tubular body, a cutter blade rotatably and slidably mounted in the tubular body, means operatable by raising of the tubular body to rotate the cutter blade from retracted position to cutting position, and means to yieldingly hold the cutter blade retracted and to feed the cutter blade inwardly when it is in the cutting position.

5. A tool of the character described comprising a tubular body, a cutter blade rotatably and slidably mounted in the tubular body, a spring engaging the cutter blade and tending to hold the cutter blade in retracted position and operating to feed the cutter blade inwardly when said blade is in cutting position, and means operatable to rotate the cutter blade from retracted position to cutting position.

6. A tool of the character described comprising a tubular body, a cutter blade shiftably mounted to move toward and from the axis of said body, means to actuate the cutter blade, a dog pivotally connected with the cutter blade actuating means to engage a drill stem to hold the blade actuating means against upward movement, and means to yieldingly hold the dog toward the drill stem.

Signed at Los Angeles, California, this 3d day of April, 1923.

ERNEST E. ANDERSON.
JOHN G. BOUSLOG.